United States Patent [19]

Syrier et al.

[11] Patent Number: 4,629,754
[45] Date of Patent: Dec. 16, 1986

[54] PIGMENTABLE COMPOSITION OF MATTER COMPRISING A MINERAL LUBRICATING OIL EXTRACT AND MODIFIED PETROLEUM AND/OR COUMARONE-INDENE RESIN

[75] Inventors: Johannes L. M. Syrier; Willem C. Vonk; Gerrit van Gooswilligen, all of Amsterdam, Netherlands

[73] Assignee: Shell Oil Company, Houston, Tex.

[21] Appl. No.: 778,943

[22] Filed: Sep. 23, 1985

[30] Foreign Application Priority Data

Oct. 15, 1984 [GB] United Kingdom ............... 8426007

[51] Int. Cl.$^4$ ........................... C08K 5/09; C08K 3/26; C08K 5/01; C08L 95/00
[52] U.S. Cl. ..................................... 524/394; 524/68; 524/69; 524/426; 524/451; 524/474; 524/504; 524/531; 524/549
[58] Field of Search .................. 524/68, 69, 474, 531, 524/549, 504, 394

[56] References Cited

U.S. PATENT DOCUMENTS

| 4,011,584 | 3/1977 | Reijendam et al. | 525/360 |
|---|---|---|---|
| 4,086,198 | 4/1978 | Mizui et al. | 524/499 |
| 4,503,176 | 3/1985 | Barlow et al. | 524/574 |
| 4,513,130 | 4/1985 | Mizui et al. | 524/554 |

OTHER PUBLICATIONS

Derwent Abst. 39325V/21 (J74017408) 1974 Nippon Mining.
Derwent Abst. 85-126931/21 (C85-055457) (SU1121279) 10-1984 Shostka Svema.
Derwent Abst. 18330D/11 (J56004668) 1-1981 Mitsubishi Oil.
Derwent Abst. 70990B/39 (J54106542) 8-1979 Mitsui Pet.
Derwent Abst. 51354K/21 (S0943259) 7-1982 Biisk Paint.
Derwent Abs. 81836X/44 (J51103134) 9-1976 Kansai Paint.
Derwent Abst. 84-100780/16 (C84-042901) Ethyl Corp 4-1984.
Derwent Abst. 63424W/38 (SU-443877) New Cons 4-1975.

Primary Examiner—Herbert J. Lilling
Attorney, Agent, or Firm—Kimbley L. Muller

[57] ABSTRACT

A binder composition which is pigmentable comprising from 30 to 99 wt % of a mineral lubricating oil extract and from 70 to 1 wt % of a petroleum resin and/or coumarone-indene resin, characterized in that the petroleum resin and/or coumarone-indene resin contains moieties derived from carboxylic acid, carboxylic acid anhydride or hydroxyl groups.

7 Claims, No Drawings

PIGMENTABLE COMPOSITION OF MATTER COMPRISING A MINERAL LUBRICATING OIL EXTRACT AND MODIFIED PETROLEUM AND/OR COUMARONE-INDENE RESIN

FIELD OF THE INVENTION

This invention relates to a pigmentable composition of matter useful as a binder agent which is derived from the combination of a mineral lubricating oil extract and a modified petroleum resin and/or coumarone-indene resin.

These binder compositions are light-coloured and therefore pigmentable, so that the ultimate mineral aggregate-, filler- or pigment-containing asphaltic compositions can be used for marking purposes by means of coloured overlays over asphaltic concrete base courses of roads.

It has now been discovered that the known binder compositions can be improved in their ductility and adhesion properties with mineral aggregates by using a special class of modified resins.

This invention therefore relates to a pigmentable binder composition comprising a mineral lubricating oil extract with a petroleum resin and/or the coumarone-indene resin containing at least one moiety selected from the group of: carboxylic acid, carboxylic acid anhydride and hydroxyl moieties. These latter resins are referred to by the expression "modified resins".

The present binder compositions are used for industrial purposes, such as in the building industry, for roofing or sealing, for pipe coatings and for hydraulic purposes.

BACKGROUND OF THE INVENTION

Resinous compositions useful as binding agents have been important components of road-building and road-repair utility for a long time. These compositions are useful in regions where there is extreme high temperatures in summer and extreme low temperatures in winter to allow for proper expansion and contraction of the road without forming holes which can cause damage to vehicles traversing them. In British Pat. No. 1,226,234 a resin is disclosed having a block copolymer and a thermoplastic material. In contradiction to the instant compositions the British patentees fail to modify the applicable resins with at least one moiety of the group chosen from carboxylic acid moities, carboxylic acid anhydride moities and hydroxyl moities. In U.S. Pat. No. 4,086,198 a composition of matter is generically disclosed comprising a polymer derived from the polymerization of olefinic materials derived from the thermocracking of petroleum in accompaniment with an alpha, beta-unsaturated carboxylic acid or anhydride thereof such a maleic acid or maleic anhydride. The latter is utilized to induce polar moiety to an indene resin. Another portion of the composition is disclosed as a mineral oil filler present in an amount from 1 to 5% based on the total weight of the composition. The mineral oil is present as a plasticizer, not as an oil extract agent. The quantity of the prior art mineral oil's presence is held to 5% which is far below the minimum specified in this binder composition, i.e. 30 wt.%. The patentees require as essential the presence of titanium dioxide as a pigment to ensure the use of the composition for a hot melt-type white traffic paint.

OBJECTS AND EMBODIMENTS OF THE INVENTION

It is therefore an object of this invention to provide a viable composition of matter without resort to the absolute existence of titanium dioxide pigments and with a modification of the petroleum and/or coumarone-indene resins.

In one aspect an embodiment of this invention resides in a pigmentable composition of matter useful as a binder agent comprising from 30 to 99 wt% mineral lubricating oil extract and from 70 to 1 wt% modified resin selected from the group consisting of petroleum resins and coumarone-indene resins, wherein said resins are modified by the addition of at least one moiety selected from the group consisting of carboxylic acid moities, carboxylic acid anhydride moieties and hydroxyl moieties.

Another embodiment of this invention resides in a pigmentable composition of matter, useful as a binder agent, comprising the combination of: from 30 to 99 wt% mineral lubricating oil extract; from 70 to 1 wt% of a modified resin selected from the group consisting of petroleum resins derived from polymerization of unsaturated compounds present in coal tar distillates, wherein either of said resins is modified by the addition of at least one moiety selected from the group consisting of carboxylic acid moieties, carboxylic acid anhdride moieties and hydroxyl moieties; and a compound selected from the group consisting of synthetic rubber and a $C_{10}$–$C_{40}$ lithium salt of a hydroxyl fatty acid.

DESCRIPTION OF THE INVENTION

The mineral lubricating oil extract is exemplified by the solvent extraction, via phenol, liquid $SO_2$ or furfural, of a Bright-Stock.

These extracts are present in an amount of from 30–99%w, and preferably 60–95%w, based on the binder.

Petroleum resins may be prepared by polymerization of unsaturated hydrocarbons present in unsaturated petroleum fractions, such as thermally cracked fractions and unsaturated hydrocarbons obtained in the pyrolysis of hydrocarbons.

Coumarone-indene resins may be prepared by polymerization of unsaturated hydrocarbons present in coal tar distillates.

The present modified resins are obtained by treating the above resins with unsaturated carboxylic acids or anhydrides, in particular maleic anhydride.

They may also be obtained by modification of the preparation process of the resins, e.g. by polymerization of the unsaturated hydrocarbons in the presence of hydroxyl groups containing unsaturated carboxylic acids or esters thereof, such as hydroxyethyl-methacrylate.

The modified resins may have acid values of e.g. 1–100, preferably 5–50 mg KOH/g.

The present modified resins are present in an amount of from 1–70%w, and preferably 5–40%w, based on the binder.

Of course mixtures of extracts and/or mixtures of modified resins, optionally together with the unmodified resins or other resins can be used.

The extracts and/or resins may partially or wholly be blown before or after blending. Normally blowing of the extract reduces the amount of resin required.

Compared with blown mixtures of extracts and unmodified resins blown mixture of extracts and the present modified resins show improved adhesive properties.

The present binder compositions may be used as cutbacks or together with a flux oil. Proportions of 30–60%w of volatile organic solvent or flux oil may e.g. be used.

The ultimate asphaltic compositions in which the present pigmentable binders may be used, usually contain mineral aggregates and fillers, each in proportions of e.g. 5–98%w, preferably 20–95%w, based on the asphaltic compositions.

Suitable mineral aggregates are stone chips, gravel, slag and sand.

Suitable fillers are mineral dusts, ground chalk, ground limestone and talc.

The present pigmentable binders may be present in proportions of e.g 1–15%w, preferably 4–8%w, based on the asphaltic composition.

Pigments may be used in proportions of 0–10%w, preferably 0.05–2%w, based on the asphaltic composition.

Suitable pigments are e.g. red and yellow iron oxides, titanium oxide (white), chromex green, cobalt blue, etc.

The present binder compositions may also contain minor proportions, such as 0–30%w, e.g. 0.5–10%w, based on the binder of other ingredients, such as blown or unblown bitumen, e.g. propane bitument; natural or synthetic rubbers, e.g. optionally hydrogenated, linear or branched, e.g. star-shaped, block copolymers of styrene and a conjugated diene (e.g. butadiene or isoprene); waxes, such as paraffin waxes; polymers such as polyethylene, polypropylene and poly(iso)butene; tackyfiers, such as Li salts of $C_{10-40}$ (hydroxy) fatty acids, e.g. Li (hydroxy) stearate to render the present compositions self-adhesive; etc.

EXAMPLE 1

A Bright-Stock furfural extract (BFE) was mixed with the following resins:
A: unmodified coumarone-indene resin
B: commercial modified petroleum resin containing carboxylic acid groups (acid value 19 mg KOH/g)
C: modified petroleum resin containing carboxylic acid groups (acid value 9.2 mg KOH/g).

Modified resins B and C are both prepared by polymerization of unsaturated hydrocarbons in the presence of maleic anhydride.

The resins were stirred with the extract at 200°–220° C. during about 30 minutes.

The obtained mixtures were tested and the results are indicated in Table A (compositions in %w).

TABLE A

| Composition: | 1 | 2 | 3 | 4 |
| --- | --- | --- | --- | --- |
| BFE | 70 | 68 | 70.5 | 67 |
| Resin A | 30 | 24 | 29 | — |
| Resin B | — | 8 | — | — |
| Resin C | — | — | — | 33 |
| Maleic anhydride | — | — | 0.5 | — |
| Properties | | | | |
| Penetration at 25° C., 0.1 mm (ASTM D 5) | 88 | 88 | 79 | 81 |
| Softening point, Ring and Ball, °C. (ASTM D 36) | 43.5 | 46 | 45 | 46 |
| Ductility at 10° C., cm (ASTM D 113) | 14 | >80 | 10 | >60 |
| Marshall Stability, N* | 7350 | 7860 | 7180 | 7330 |
| Marshall Stability after 14 days at 60° C. under water, N* | 0 | 6850 | 6500 | 6780 |

TABLE A-continued

| Composition: | 1 | 2 | 3 | 4 |
| --- | --- | --- | --- | --- |
| Retained stability, % | 0 | 87 | 90 | 92 |

*ASTM D 1559, at 60° C., dense asphaltic concrete, 5.8% binder, about 5% voids.

This Table shows the excellent overall properties of the compositions according to the present invention (compositions 2 and 4) and the much improved ductility properties of the present compositions 2 and 4 compared with compositions 1 and 3 containing unmodified resin.

EXAMPLE 2

The following components were mixed to obtain a joint sealing composition (%w):
40.5 blend of BFE and carboxylated petroleum resin, weight ratio 75:25, PEN (25° C., 0.1 mm) 200
36.3 limestone filler
4.7 lithium stearate
1.7 branched styrene/butadiene/styrene block copolymer (30% styrene)
1.0 dioleate of oleyl aminopropylene diamine
13.8 dichloromethane
2.0 pigment The properties, after evaporation of solvent, are indicated in Table B.

TABLE B

| | |
| --- | --- |
| PEN (25° C., 0.1 mm) | 44 |
| Dropping point, °C. (IP 132/65) | 191 |
| Flow 1.5 mm, 14 days, vertical, 90° C. | none |

Good wet tack properties are found on concrete, wood, glass and aluminum.

EXAMPLE 3

The following components were mixed to obtain a roofing composition (%w):
blend of 91%w mixture of BFE and carboxylated petroleum resin (weight ratio 75.4:24.6) and 9%w hydrogenated linear styrene/butadiene/styrene block copolymer (33% styrene)
limestone filler
$TiO_2$
pph pigment The properties are indicated in Table C.

TABLE C

| | |
| --- | --- |
| Softening point R & B (°C.) | 121 |
| Penetration 25° C. (0.1 mm) | 46 |
| Viscosity 180° C. (mPas) | 9360 |
| 200° C. | 3910 |
| 220° C. | 1630 |
| Cold Bend (φ 30 mm, 5 s) (DIN 52123) | |
| pass (°C.) | −10 |
| fail (°C.) | −15 |
| Flow resistance (2 h) (DIN 52123) | |
| pass (°C.) | 110 |
| fail (°C.) | 115 |
| Tensile test (ASTM D 2523-66T/D 412, ASTM 1708/70) | |
| Yield stress ($10^5$ N/m$^2$) | 3.5 |
| modulus 300% ($10^5$ N/m$^2$) | 4.0 |
| modulus 500% ($10^5$ N/m$^2$) | 6.2 |
| maximum stress ($10^5$ N/m$^2$) | 14.3 |
| elongation at max stress (%) | 980 |
| stress at break (%) | 1000 |

What we claim as our invention:

1. A pigmentable composition of matter, useful as a binder agent, consisting essentially of the combination of:
   (a) from about 30 to about 99 wt% of a mineral lubricating oil extract;
   (b) from about 70 to about 1 wt% of a modified resin selected from the group consisting of petroleum resins derived from polymerization of unsaturated compounds present in pyrolytically cracked hydrocarbonaceous material and coumarone-indene resins derived from polymerization of unsaturated compounds present in coal tar distillates, wherein either of said resins is modified by the addition of at least one moiety selected from the group consisting of carboxylic acid moieties, carboxylic acid anhydride moieties and hydroxyl moieties; and
   (c) a $C_{10}$–$C_{40}$ lithium salt of a hydroxy fatty acid constituting the remainder of the composition wherein said mineral lubricating oil and said modified resin are present in total weight percent combination of less than 100%.

2. The pigmentable composition of matter of claim 1 wherein said mineral lubricating oil extract is a Bright-Stock furfural extract.

3. The pigmentable composition of matter of claim 1 wherein said mineral lubricating oil extract is present in an amount of 60–95 wt% and said modified resin is present in an amount of 40–5 wt%.

4. The pigmentable composition of matter of claim 1 wherein modified petroleum resin comprise resins derived from polymerization of unsaturated hydrocarbons present in thermally cracked hydrocarbonaceous material and wherein the modified resin is modified by treating said derived resin with maleic anhydride.

5. The pigmentable composition of matter of claim 1 wherein said modified coumarone-indene resins comprise resins derived from polymerization of unsaturated hydrocarbons present in coal tar distillates, wherein the modified resin has been modified by treating said derived resin with maleic anhydride.

6. The pigmentable composition of matter of claim 1, useful as a binder agent in the association with a mineral aggregate selected from the group consisting of stone chips, gravel, slag and sand.

7. The pigmentable composition of matter of claim 1, useful as a binder agent in the association with fillers selected from the group consisting of mineral dusts, ground chalk, ground limestone and talc.

* * * * *